Feb. 6, 1940.     H. G. MILLER     2,189,568
OPTICAL APPARATUS
Filed July 26, 1937     2 Sheets—Sheet 1
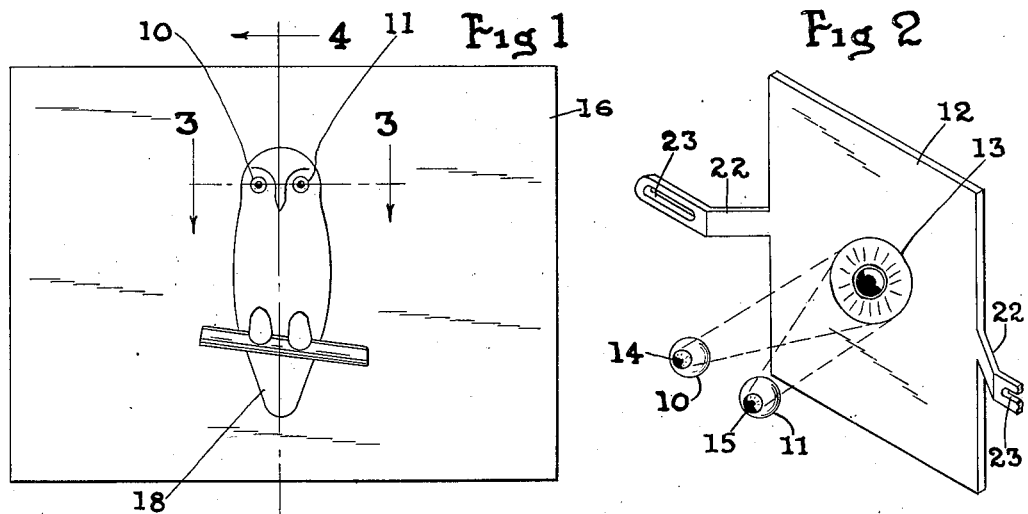
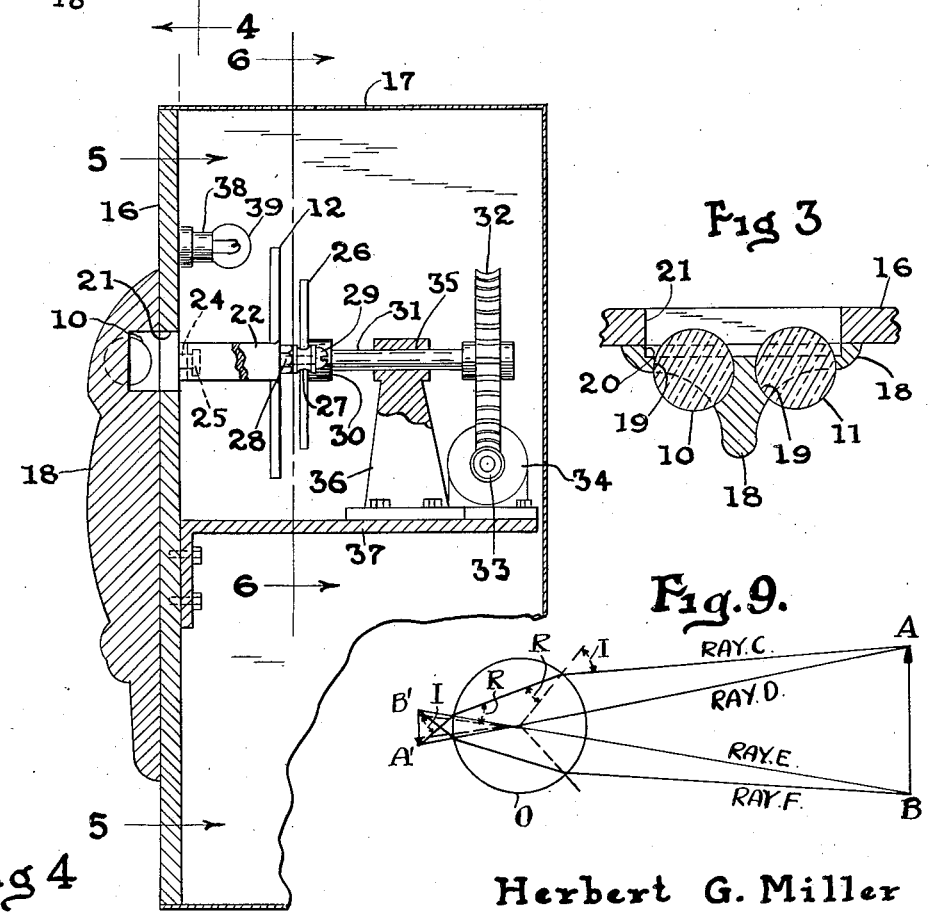
Herbert G. Miller
INVENTOR
BY Freeman, Swart, Albrecht & Weidman
ATTORNEYS Feb. 6, 1940. H. G. MILLER 2,189,568
OPTICAL APPARATUS
Filed July 26, 1937 2 Sheets-Sheet 2
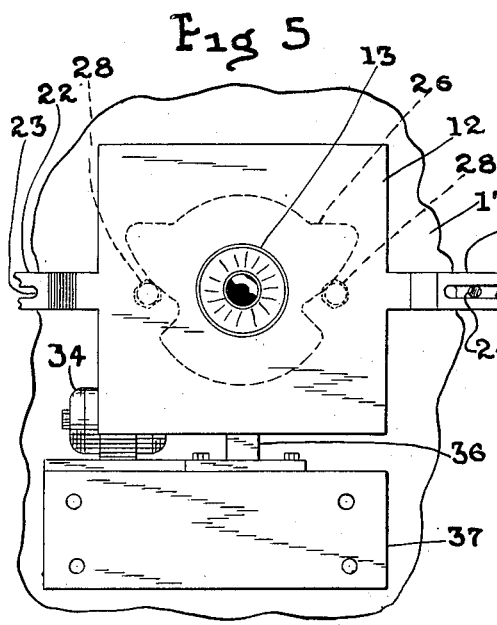
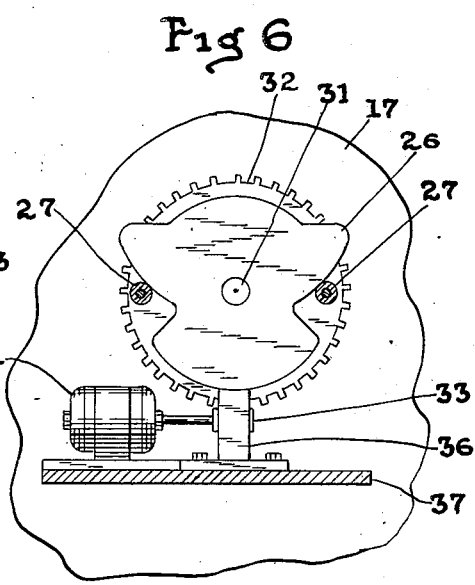
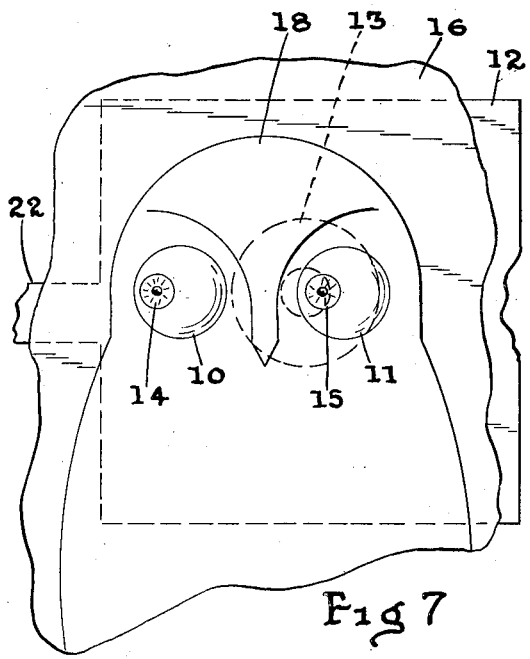
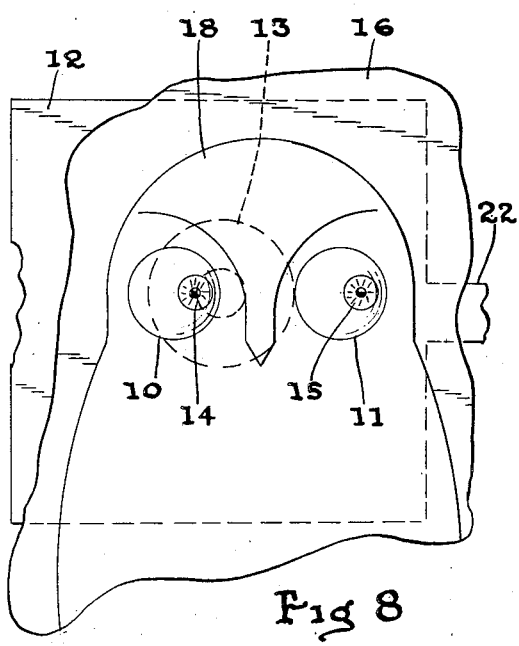
Herbert G. Miller
INVENTOR
ATTORNEYS Patented Feb. 6, 1940

2,189,568

UNITED STATES PATENT OFFICE 2,189,568

OPTICAL APPARATUS

Herbert G. Miller, Lakewood, Ohio

Application July 26, 1937, Serial No. 155,631

7 Claims. (Cl. 88—1)

This invention relates to optical apparatus, and may be used in combination with numerous devices, such as advertising devices, to draw attention to the advertisements carried by such devices, or with amusement devices, and it will be apparent that the invention may have uses other than those pointed out. The principal object of the invention is to provide new and improved apparatus of this type.

In the drawings accompanying this specification and forming a part of this application, there is shown, for purposes of illustration, one form which the invention may assume, and in these drawings:

Figure 1 is a front elevational view of an embodiment of the invention,

Figure 2 illustrates the arrangement of certain parts of the embodiment,

Figure 3 is an enlarged horizontal section corresponding generally to the line 3—3 of Figure 1, Figure 4 is an enlarged vertical section corresponding to the line 4—4 of Figure 1, a portion being broken away to better fit the view to the sheet, Figure 5 is a fragmentary vertical sectional view corresponding generally to the line 5—5 of Figure 4, Figure 6 is a fragmentary vertical sectional view corresponding generally to the line 6—6 of Figure 4, Figures 7 and 8 illustrate parts of the embodiment in different positions, the parts being enlarged and fragmentarily shown, and Figure 9 is a light ray diagram.

Referring to the drawings, the embodiment of the invention comprises a pair of lenses 10 and 11, each of which may be a ball formed of glass, as shown. Spaced from the lenses 10 and 11 is an object carrying member 12, here shown to be rectangular in shape, and formed of rather thin material, such as sheet-metal, cardboard, or the like. The member 12 is provided with an object, such as the configurations 13 simulating the iris and pupil of an eye. It will be apparent that if the lenses 10 and 11, and the member 12, are properly constructed and arranged, such as in the manner suggested in Figure 2, light will be reflected from the member 12 in a direction toward the lenses 10 and 11, and light reflections from the configurations 13 will cause images 14 and 15 to appear at the lenses 10 and 11 respectively. The lenses 10 and 11, and the member 12, are movable relatively to each other, and it will be obvious that relative movement of these parts will cause corresponding shifting of the images 14 and 15 with respect to the lenses 10 and 11. For instance, if the member 12 were shifted horizontally, vertically, or otherwise, in its own plane, the images 14 and 15 will shift a proportionate amount with respect to the lenses 10 and 11. Also, if the member 12 is moved toward or away from the lenses 10 and 11, the images 14 and 15 will appear larger or smaller with respect to the lenses 10 and 11, depending upon the movement of the member 12.

Referring to Figure 9, the object, such as the configuration 13, is represented by the arrow AB, and one of the lenses 10 or 11 is represented by the circle O. Light rays C and F from the object AB strike the lens O, each being refracted on passing into the lens according to the well-known Snell's law, where the index of refraction is equal to the ratio of sin I to sin R. Using a value of 1.50 (a usual value for glass) each of the rays will be bent somewhat, as shown in Figure 9, and each will proceed through the sphere to the opposite surface of the lens O, where each will emerge and be bent again, the same amount as on entering, and then proceed on. Rays D and E are drawn directly through the center of the lens O, and will not be deviated at all, either on entering or leaving, since these rays meet the surface of the lens O at right angles. The rays D and E proceed straight on from the lens O, and intercept rays C and F respectively at A' and B'. The two points A' and B' locate the image of the object AB. For ordinary glass with index of refraction of about 1.50, an object ten inches from a surface of a one-inch glass sphere would form an image three-sixteenths of an inch on the opposite surface of the sphere. The image would seem to rest on the surface of the glass, and would seem to move slightly if an observer moved his point of view. The image A'B' would appear inverted, and would move in a direction opposite to any motion that the object AB would make.

Means are here shown for supporting the lenses 10 and 11, and also for supporting the member 12 for movement. These means comprise a supporting plate 16 closing one end of a casing 17. In the embodiment shown by the drawings, the outer surface of the supporting plate 16 provides a base for material 18 which is shaped to simulate an owl in bas-relief. Of course it will be apparent that the material 18 may be shaped to simulate any other desired object, or the front surface may be provided with any suitable advertising matter, or the like.

As shown in Figures 3 and 4, the material 18 is provided with a pair of apertures 19, into which the lenses 10 and 11 are disposed and secured, and the apertures 19 communicate with a well 20, which is in alignment with an elongated aperture 21 formed in the supporting plate 16. The apertures 19 are so positioned that the lenses 10 and 11 form part of the owl's eyes, as will be evident by inspection of Figures 1, 7, and 8.

The member 12 is spaced from the inner surface of the supporting plate 16, and is provided with angular arms 22 extending from opposite margins, each of the arms having a slotted portion 23, the slots in these portions accommodating pins 24 carried by the supporting plate 16, and each of the pins 24 is headed as shown at 25 to prevent disposition of the object member 12. The construction, as shown, provides for horizontal shifting of the member 12 in its own plane, although it will be obvious that the member 12 may be supported with respect to the supporting plate 16 to have movement other than that herein shown.

Spaced from the member 12 is a cam 26, having its marginal defining surface engaging rollers 27 carried by the member 12. Nuts 28 are secured in properly spaced position to the member 12, and a screw 29 journals the roller 27, and has its threaded end engaging a respective nut 28. The cam 26 is provided with a recessed boss 30 which receives one end of a shaft 31, and the other end of the shaft carries a worm gear 32, which meshes with a worm 33 secured to the armature shaft of an electric motor 34.

The shaft 31 is carried for rotation by means of a bearing 35, the latter forming part of a pedestal 36 which is secured to a platform 37 fastened to the inner surface of the supporting plate 16. The inner surface of the supporting plate 16 carries means for illuminating the member 12, and as shown, a socket 38 is secured to this inner surface, and provides means for accommodating an incandescent electric lamp 39, the socket and lamp being preferably positioned so that no glaring light will be directed toward the lenses 10 and 11.

With the motor 34 operating, the worm 33 turns the wheel 32, which in turn rotates the shaft 31, and the cam 26 carried by the shaft 31. Rotation of the cam 26 causes the rollers 27 to ride over the marginal surface of the cam 26, and thereby move the member 12, so as to effect shifting of the images 14 and 15 with respect to the lenses 10 and 11. The cam 26 here shown, is shaped to provide horizontal shifting of the member 12 in its own plane, and has dwell portions constructed and arranged to cause the member 12 to dwell in a certain position. The cam 26 also has portions which may cooperate with rollers (not shown or used in this embodiment) for shifting the member 12 vertically in its own plane. It will be appreciated that the cam 26 may be rotated by means other than that herein shown, and also that means other than the cam 26 may be used to effect movement of the member 12, and that the member 12 may be rotated, or shifted toward and away from the supporting plate 16.

Figures 7 and 8 show parts of the construction in different positions, and in Figure 7, the member 12 has been shifted from a central position to the right, and the reflection of the configurations 13 are seen as the images 14 and 15 in the lenses 10 and 11, and these images have shifted to the left. In Figure 8, the member 12 has been shifted to the left, thereby causing the images 14 and 15 to shift to the right with respect to the lenses 10 and 11.

It will be appreciated that the configurations 13 may be duplicated, one set for each of the lenses, and this may be desirable if the lenses are spaced too widely, in order to avoid distortion. Also, the configurations need not simulate the pupil of an eye, but may simulate some other suitable object, and the reflection of these configurations may cooperate with the lenses for purposes other than those herein pointed out. The configurations 13 of course, may be formed on the surface of the object member 12 in any suitable manner, and the lenses 10 and 11 may be colored, or not, as desired.

From the foregoing it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A display device, comprising: a first element representing a creature of the type having eyes, said element having an aperture located at an eye position of said representation; lens means disposed in said aperture; a second element spaced from said first element and having a representation of the iris and pupil of an eye thereon; said lens means and said second element being so constructed and arranged that the image of said representation of said iris and pupil formed by said lens means will appear on said lens means to be a part of said eye.

2. A display device, comprising: a representation of a creature, having socket means for an eye; lens means, disposed within said socket means, of a size approximating the eye of said representation; object means, representing the iris and pupil of the creature's eye, spaced from said lens means; said lens means being so constructed and arranged that light rays from said object means form an image of the iris and pupil at said lens means.

3. A display device comprising: a representation of a creature, having a pair of sockets spaced-apart a distance approximating the spacing of the eye sockets of that creature; a substantially complete spherical lens disposed in each socket; object means, having the representation of a single iris and pupil of the creature's eye, said object means being so spaced from said pair of lens means that rays of light from said object means strike each of said lens means, forming images of the iris and pupil at each of said lens means.

4. A display device, comprising: a first element representing a creature of the type having eyes, said element having an aperture located at an eye position of said representation; lens means disposed in said aperture; a second element spaced from said first element and having a representation of the iris and pupil of an eye thereon; said lens means and said second element being so constructed and arranged that the image of said representation of said iris and pupil formed by said lens means will appear on said lens means to be a part of said eye; and means shifting said first and second elements relatively with respect to each other, causing said image to appear to move relative to said lens means.

5. A display device, comprising: lens means, so constructed and arranged as to represent a predetermined part of a living creature; and object means, representing another part of said creature, said object means being spaced from said lens means, and so constructed and arranged that light rays from said object means enter one surface of said lens means, said rays being refracted by passage through said lens means, and form an image visible at the opposite surface of said lens means, said image and said lens means cooperating to produce a composite life-like representation of the two parts of said creature.

6. A display device, comprising: lens means, representing the eye ball of the eye of a creature; and object means, spaced from said lens means, and providing a representation of the iris and pupil of the eye of the creature, said lens means and said object means being so constructed and arranged that the image of said representation formed by said lens means will appear at said lens means to be a part of the eye of the creature.

7. A display device, comprising: a single object means, providing a representation of the iris and pupil of the eye of a creature; and a pair of lens means, each simulating an eye ball of the creature, said lens means being spaced apart a distance substantially corresponding to the spacing of the eyes of a living creature; said single object means and said pair of lens means being so arranged relative to each other that light rays from said object means pass through respective lens means and form an image of said representation at each lens means, said images cooperating with the respective lens means to provide the appearance of life-like eyes.

HERBERT G. MILLER.